United States Patent [19]

Moosmann et al.

[11] Patent Number: 5,347,445
[45] Date of Patent: Sep. 13, 1994

[54] METHOD OF ADAPTIVE CONTROL OF POSITION-ADJUSTABLE DRIVES IN WHICH DRIVE DISTANCES ARE DIVIDED INTO EVALUATION ZONES AND DRIVE PARAMETERS ARE DETERMINED BY TABLE LOOKUP ADDRESSING

[75] Inventors: Bernhard Moosmann, Hardt; Jürgen Fischer, Schramberg-S.; Wolfgang Bauspiess, Villingen, all of Fed. Rep. of Germany

[73] Assignee: Mannesmann Aktiengesellschaft, Düsseldorf, Fed. Rep. of Germany

[21] Appl. No.: 808,668

[22] Filed: Dec. 17, 1991

[30] Foreign Application Priority Data

Dec. 17, 1990 [DE] Fed. Rep. of Germany ....... 4040796

[51] Int. Cl.$^5$ .............................................. G05B 13/02
[52] U.S. Cl. ................................. 364/148; 364/167.01
[58] Field of Search ................... 364/148, 167.01, 442, 364/431.12

[56] References Cited

U.S. PATENT DOCUMENTS

| | | | |
|---|---|---|---|
| 4,488,236 | 12/1984 | Morrison et al. | 364/442 |
| 4,922,468 | 5/1990 | Menezes | 367/139 |
| 5,014,051 | 5/1991 | Lippmann et al. | 340/870.38 |
| 5,091,858 | 2/1992 | Paielli | 364/431.12 |
| 5,121,443 | 6/1992 | Tomlinson | 382/29 |

OTHER PUBLICATIONS

R. Rusterholz, "Comparison of Different Control Concepts for Designing Pneumatic Servo Drives", Pneumatics, v. 3, pp. 159–178) Full Document (English).

Primary Examiner—Jerry Smith
Assistant Examiner—Cameron H. Tousi
Attorney, Agent, or Firm—Horst M. Kasper

[57] ABSTRACT

In a method for the adaptive automatic control of position-adjustable drives, optimized parameters are determined from the drive motion, wherein the optimized parameters are stored with corrected parameters entered into data memory storage. In order to avoid in a method of this kind, involving a reduction of the cycle times, an overshooting in the target position, even in case of non-cyclical positioning sequences, a drive distance, determinant for an operational course, is determined between its stop points and is subdivided into calculated, consecutively numbered distance zones or angle zones and these numbers of system zones or numbers of angle zones are stored in a data memory storage. With the aid of the thus determined distance zones or angle zones, the values describing the drive motions are determined and are sub-divided in each case into a consecutively numbered zone system and are stored in a data memory storage. A data address is calculated from the number of a zone of a first zone system and from the number of a zone of at least a second zone system. An automatic control parameter field for the drive motion, stored in a data memory storage, is addressed with the calculated data address. The addressed parameters are entered for the adjustment value determination into the automatic control system.

18 Claims, 4 Drawing Sheets

METHOD OF ADAPTIVE CONTROL OF POSITION-ADJUSTABLE DRIVES IN WHICH DRIVE DISTANCES ARE DIVIDED INTO EVALUATION ZONES AND DRIVE PARAMETERS ARE DETERMINED BY TABLE LOOKUP ADDRESSING

BACKGROUND OF THE INVENTION

1. Field of the Invention

The invention relates to a method for the adaptive automatic control and adjustment of positioning drives, where optimized parameters are determined from the drive motion, and wherein said parameters are corrected and stored in case of a deviation from parameters stored in data storage memories.

2. Brief Description of the Background of the Invention Including Prior Art

Sets of automatic control parameters, adapted to the task at hand, are frequently required in connection with automatically controlled, position-adjustable drives for performing the various positioning tasks. This holds in particular for drives according to the servo-pneumatic drive principle. The difficulty of the automatic control of servo-pneumatic drives is associated with the non-linear behavior of valves and cylinders and depends on the compressibility of the pressure agent. A non-linear, load-dependent control system results in this case in practical situations. It is known to build so-called self-adaptive automatic control systems for adapting the motion values, predeterminable from the respective differential equations and the corresponding set values, based on a determination decisive and appropriate for the control. Not only is an automatic control performed based on a comparison of the set point value and the actual value for the deviation, but in addition the automatic control parameters, to be coordinated to the respective drive motion, are optimized to achieve shorter driving times according to a self-adaptive process and are stored. This means that the automatic control parameters are predetermined at the first passage run and that the automatic control parameters are determined upon repeated passage runs by a practical optimization at the target point as optimized automatic control parameters and are stored for the next passage run. Such systems are generally designated as adaptive controls. Such an automatic control concept is known from a published paper of Professor Rusterholz presented at the 7th Aachener Fluidtechnisches Kolloquium March 1986, Aachen, Federal Republic of Germany contributions to the art field "Pneumatics", volume 3, pages 159–178, in particular 172. The automatic control parameters are adapted to the actual path parameters according to this known method and are designated as controlled adaption. Dependent on the possible piston positions, the corresponding automatic control parameters are read from a fixed value memory storage of a microcomputer and are entered into the automatic control process. The state of the starting and target position has a decisive influence on the optimum value of the adaptive automatic control parameters in connection with servo-pneumatic drives since, dependent on the position of the movable drive part, the compressed air volume, to be controlled by the valves, can vary substantially in the cylinder pipe. This position dependency is also taken into consideration in this conventional method by furnishing a set of adaptive automatic control parameters from a corresponding fixed value memory storage for each position of the drive part of the servo-pneumatic drive and by correcting said set of adaptive automatic control parameters after the end of the task possibly based on observed automatic control target deviations and by providing said possibly corrected set of parameters for the next similar position task. According to the conventional automatic control methods, various values are employed as characterizing numbers for addressing a specific set of automatic control parameters. The coordination of the parameter set to the stored target position, to the drive path, or to the step number of the machine cycle are known. It is a disadvantage in connection with this known method that taking into consideration, for example, only the piston end position is insufficient in order to achieve optimum piston motions. A particular consideration of non-cyclical positioning sequences does also not find any particular attention in the conventional method illustrated. This and other conventional methods become very problematic where target positions have to be reached by driving from different distances, where the distances of the target positions vary substantially based on the stop, and where the positioning is not performed cyclically, or where the number of the positions to be reached cannot be determined for example, in case of furnishing positions based on a master computer or based on an adaptation of the positioning tasks to data of an image evaluation.

In summary, it can be said that the conventional automatic control methods are either exclusively dependent on position, dependent on stroke or, respectively, dependent on distance or they are set dependent or, respectively, cycle dependent. In this case, the position-dependent automatic control does not take into consideration any path distances, the distance-dependent automatic control does not take into consideration any edge position, for example, in the end stop region, and the cycle-dependent automatic control does not take into consideration any non-cyclical positioning tasks. In case of a non-critical selection of a parameter set by overshooting in the target position, there can occur a dangerous operational state. In order to avoid these conditions, frequently a high automatic controller damping is programmed 1 which, however, when not optimally adapted, will result in clock-cycle losses.

SUMMARY OF THE INVENTION

Purposes of the Invention

It is an object of the invention to provide a method of the kind recited where, upon a reduction of the cycle times an overshooting is avoided in the target position proper even in case of a non-cyclical positioning sequence.

It is another object of the invention to furnish an adaptive positioning circuit for a speedy reaching of a final position.

These and other objects and advantages of the present invention will become evident from the description which follows.

Brief Description of the Invention

According to the present invention, there is provided for a method for the adaptive automatic control of position-adjustable drives for determining parameters, optimized from the drive motion. A drive distance is evaluated determining an operational course between its stop points. Said drive distance is subdivided into calculated, consecutively numbered evaluation zones. Values of the evaluation zones are stored in a data memory storage. The parameters describing the drive motion are determined with the aid of the thus calculated evaluation zones. The parameters describing the drive motion are in each case subdivided into a consecutively numbered zone system. The parameters are stored in the data memory storage. A data address is calculated from the number of a zone of a first zone system and from the number of a zone of at least a second zone system. An automatic control parameter field for the drive motion is stored in the memory storage. The automatic control parameter field is controlled with the calculated data address. The control parameters for the adjustment value determination are entered into an automatic control circuit.

Said parameters can be corrected upon deviation based on parameters stored in the data memory storage.

The evaluation zones can be distance zones or angle zones.

Possible start positions of the drive from a first zone system and possible target positions or, respectively, possible drive distances or, respectively, possible drive angles of the drive from a second zone system can be employed for calculating a data address in the automatic control parameter field.

Possible target positions of the drive from a first zone system and the possible drive distances or, respectively, the possible drive angles of the drive from a second zone system can be employed for calculating a data address of the automatic control parameter field.

A further zone system can be formed with the drive speeds required for the positioning tasks. The numerical values of the further zone system can be used additionally for a calculation of the data address in the automatic control parameter field.

The mass load can be taken into consideration in a further zone system. The number of the corresponding mass load zones can be determined from the start acceleration. The corresponding number of the zone can also be used for the calculation of the data address of the automatic control parameter field.

According to the invention method for the adaptive automatic control of positioning drives, there is determined a drive distance path, determining and controlling the course of operation, between the stop points of the drives. The drive distance is subdivided into calculated, numerically subdivided distance or angle zones and the resultant parameters are stored in a data storage. The advantage is hereby provided that, for each start of operation of the positioning drive, an optimum adaptation of the dimensional factors can be performed of an in each case individually planned course of operation to the physical automatic controlled parameters such as, for example, drive speed, drive acceleration, compressed air volumes, and the like. The parameters, describing the drive motions, are determined with the aid of the thus determined distances or angle zones and they are in each case subdivided into a numbered through zone system and are stored in a data memory storage. This is associated with the advantage that the access between the distance zones or angle zones and the optimum automatic control parameters or, respectively, the finally provided control signals is assured in the most simple way. The data addressing for the automatic control parameters of the automatic control parameter field is calculated from the number of a zone of a first zone system and the number of a zone of at least one further zone system and this allows an optimum adaptation to the respective physically present situation.

The improvement of this method is based on the situation that not only one single criterion such as, for example, the target position or the set number of the machine cycle is employed for the selection of the suitable parameter set, but that instead two or more characterizing numbers, independent of each other, are derived from the positioning task, where the characterizing numbers are combined to an index and thus provide the access into the field of the automatic control parameter memory storage.

According to a preferred embodiment, the possible starting positions are used as a first zone system and the possible target positions of the drive are used as a second zone system for accessing data addresses in the automatic control parameter field. It is not useful in this context to coordinate to each possible combination of start and target positions its own parameter set, but it is more favorable to combine similar positioning tasks in order to obtain a quicker approach and approximation of the floating integration of the adaptive automatic control parameters to a stable average value.

A further advantageous embodiment results if the possible start or target positions used as a first zone system and the possible drive distance paths or the drive path angles of the drive used as a second zone are employed for the calculation of the data address of the automatic control parameter field. It is advantageous for the operation with more than two zone systems, from which the data addresses are calculated, that the drive speeds entered in the positioning tasks form a further zone system, where the number of the further zone system is additionally employed for the calculation of the data address in the automatic control parameter field.

A further possibility comprises that the mass load is taken into consideration as a further zone system, wherein the number of the corresponding mass load zone is determined from the start acceleration, and wherein the corresponding number of the zone is also employed for the determination of the data address in the automatic control parameter field. The consideration of the useful load is derived from the consideration of the mass load and is associated with the advantage of an automatic control adapted to every possible operational situation.

These possibilities thus allow an optimum adaptation of all operating parameters, i.e., not only of the starting positions and the target positions, but taking into consideration all physical parameters relevant for the operational course, for the optimum, clock-cycle-reducing mode of operation of the positioning drive. The access to the starting positions and the target positions and to further given physical parameters in combination with the step, to subdivide these parameters then also into corresponding zones and to find the data address of the optimum automatic control parameter from the indices of these zones, allows even in case of non-cyclical positioning tasks to achieve a minimum drive time or, respectively, cycle time and to simultaneously prevent that the positioning drive overshoots the target position.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENTS

According to the present invention, there is provided for a method for the adaptive automatic control of position-adjustable drives. Parameters, optimized from the drive motion, are determined and, upon deviation, said parameters are corrected based on parameters stored in the data memory storage and the corrected parameters are stored. A drive distance, determining an operational course, is evaluated between its stop points. Said drive distance is subdivided into calculated, consecutively numbered evaluation zones. Values of the evaluation zones are stored in a data memory storage. The parameters describing the drive motion are determined with the aid of the thus calculated evaluation zones, and are in each case subdivided into a consecutively numbered zone system and are stored in the data memory storage. A data address is calculated from the number of a zone o#a first zone system and from the number of a zone of at least a second zone system. An automatic control parameter field for the drive motion is stored in a memory storage and is controlled with the calculated data address. The controlled parameters for the adjustment value determination are entered into the automatic control.

The evaluation zones can be distance zones or angle zones.

The possible start positions of the drive from a first zone system and the possible target positions of the drive from a second zone system can be employed for calculating the data address in the automatic control parameter field.

The possible starting positions or target positions of the drive from a first zone system and the possible drive distances or the drive angles of the drive from a second zone system can be used for calculating the data address of the automatic control parameter field.

The drive speeds required for the positioning tasks can form a further zone system. The numerical values of the further zone system can also be used for the calculation of the data address in the automatic control parameter field.

The mass load can be taken into consideration in a further zone system. The number of the corresponding mass load zones can be determined from the start acceleration. The corresponding number of the zone can also be used for the calculation of the data address of the automatic control parameter field.

Figure 1A:
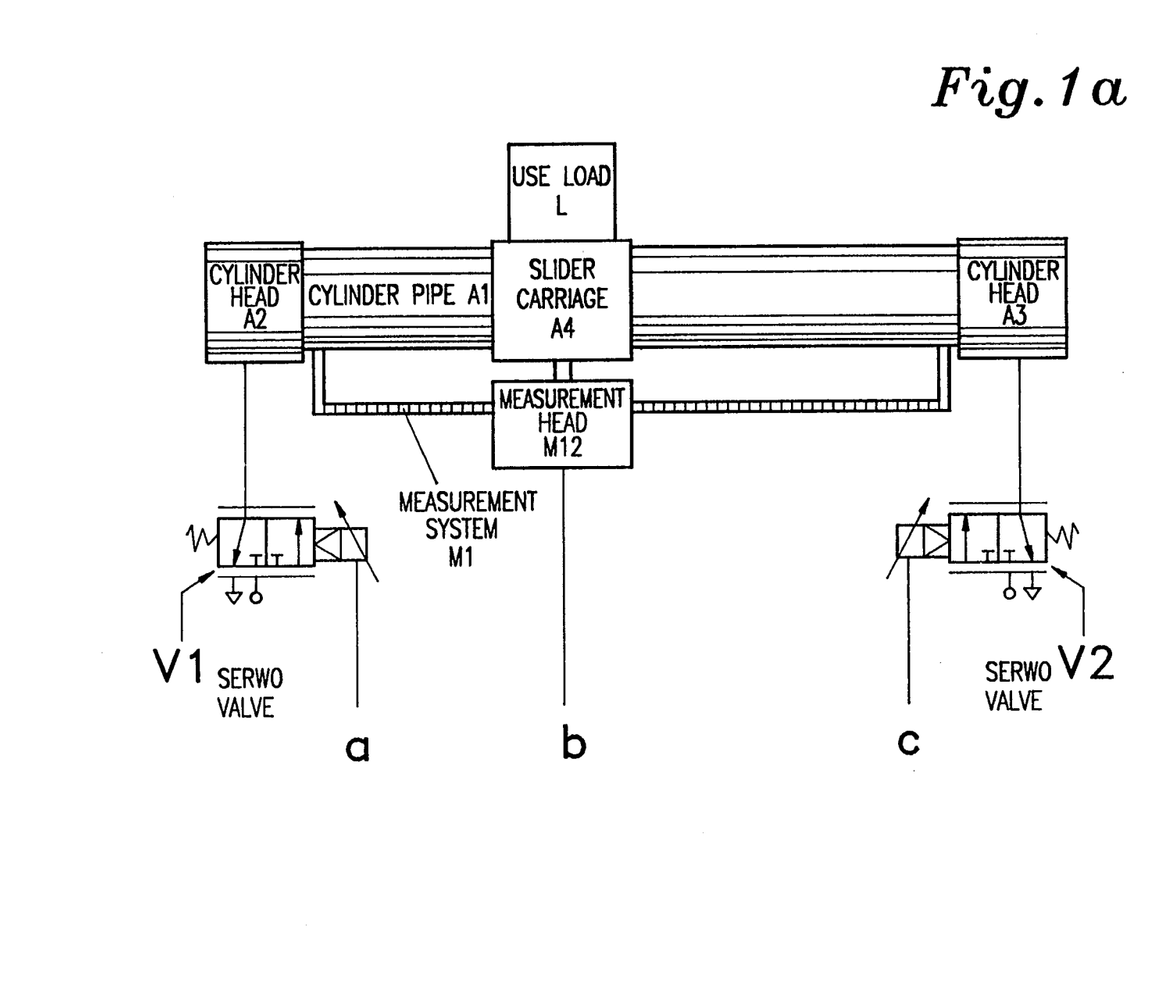
FIG. 1a is a schematic overall view of a linear drive.

FIG. 1a illustrates a servopneumatic linear drive including a cylinder pipe A1, cylinder heads A2, A3 and a slider carriage A4. A measurement system M1 for the pick up of the slider carriage A4 position is disposed at the cylinder pipe A1. The measurement head M2, connected to the slider carriage A4 engages thereby in this case into this measurement system M1 and measurably furnishes the position of the slider carriage. All parameters relevant for the motion can be determined and derived from this positioning pick-up. Acceleration, drive speed, start position and target position, as well as mass load can be determined from the determined positioning valves. This mass load is derived from the determined start acceleration and takes into consideration overall both the use load to be moved as well as the mass of the piston and of the means connected to the piston, such as pulling strip and the like, possibly also of the friction.

The cylinder heads A2, A3 are in each case connected to a servo valve V1, V2, wherein the servo valves advantageously are disposed as integrated units in the cylinder heads. This is associated with the result that, on the one hand, no losses are present via additional electrical lines or pneumatic lines and that, on the other hand, the servo valve subjects the cylinder spaces in the cylinder pipe with a fluid pressure based on a correspondingly short response time. The servo valves V1, V2 as well as the pick-up of the measurement system at the slider carriage are controlled or, respectively, are picked up via a digital automatic controller D (FIG. 1b).

Figure 1B:
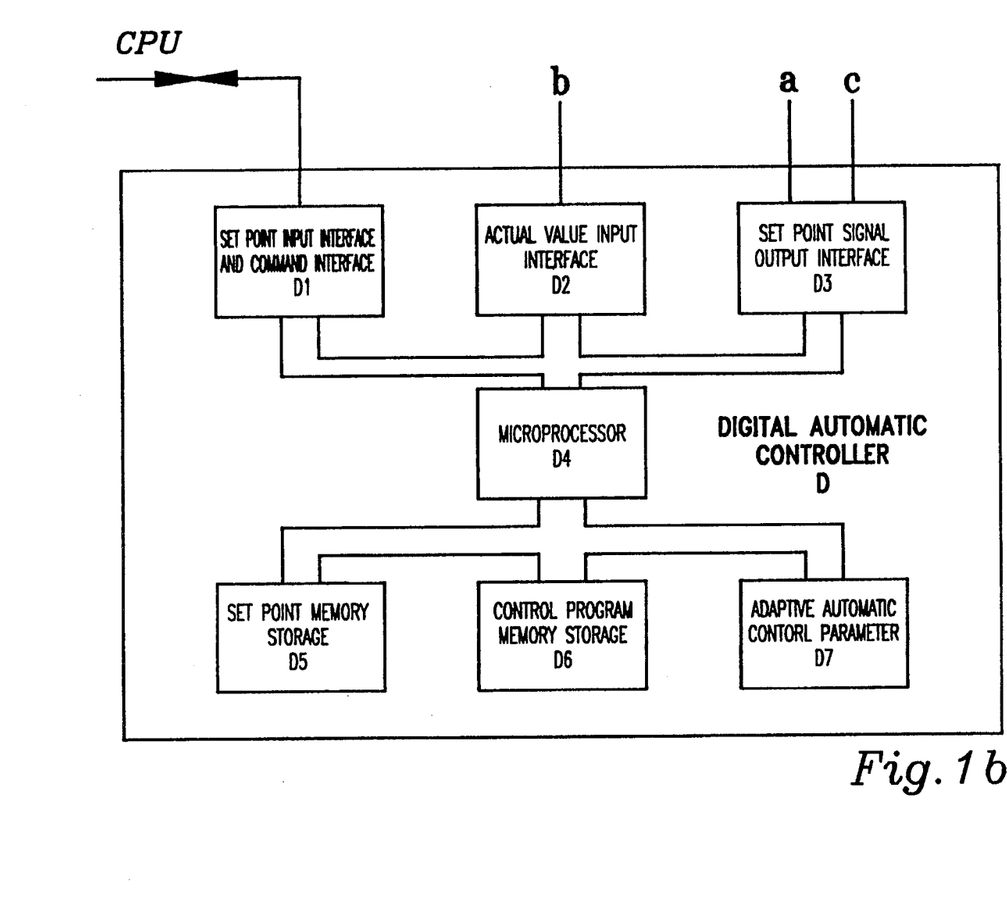
FIG. 1b is a schematic overall view of a digital automatic controller.

The electrical control connection of the valve V1 is connected through a communication line a, to the set point signal output interface D3 of the digital automatic controller D (FIG. 1b). The control connection of the servo valve V2 is also connected to this set point signal output interface D3 through a communication line c. The pick-up of the measurement system at the slider carriage is electrically connected through a communication to the actual value input interface D2 (FIG. 1b). The actual value input interface D2 is furnished with a connection on the output side to the adjustment signal output interface D3 and with a connection to the set point input and command interface D1 (FIG. 1b). A digital automatic controller D is shown in FIG. 1b.

A data line runs from the set point input interface and command interface D1 and the adjustment signal output interface D3 to a microprocessor D4, which is connected on the output side both to the set point memory storage D5 as well as to the memory storage for the adaptive automatic control parameter D7. The control program memory storage D6 furnishes simultaneously the connection between the set point memory storage D5 and the memory storage for the adaptive automatic control parameter D7.

The set point input and command interface D1 is furnished with a direct connection to the computer or, respectively, to the master system, where the determination of the physical parameters and the calculation of the data addresses as well as the adaptation of the automatic control parameters to the given physical factors are calculated. The result is thereby transmitted over the existing line back again to the set point input and command interface D1. The set point input and control interface D1 then performs the automatic control for adaptive automatic control parameters D7 via the microprocessor D4 and the memory storage. The corresponding control signals for the valves V1 and V2 are then delivered on the output side at the adjustment signal output interface D3.

All physical values and parameters are thus first taken into consideration in the microprocessor D4 and then, finally, calculated and processed into compressed-air volume determining control signals for the servo valves. The adjustment signal output interface D3 then transmits only the corresponding control signals to the servo valves V1 and V2 (FIG. 1d). The use load L, connected to the slider carriage, thereby influences the overall and complete course of motion, since the changed acceleration, as compared to the non-loaded case, is also registered by the measurement system and is correspondingly transmitted to the control system.

Figure 2:
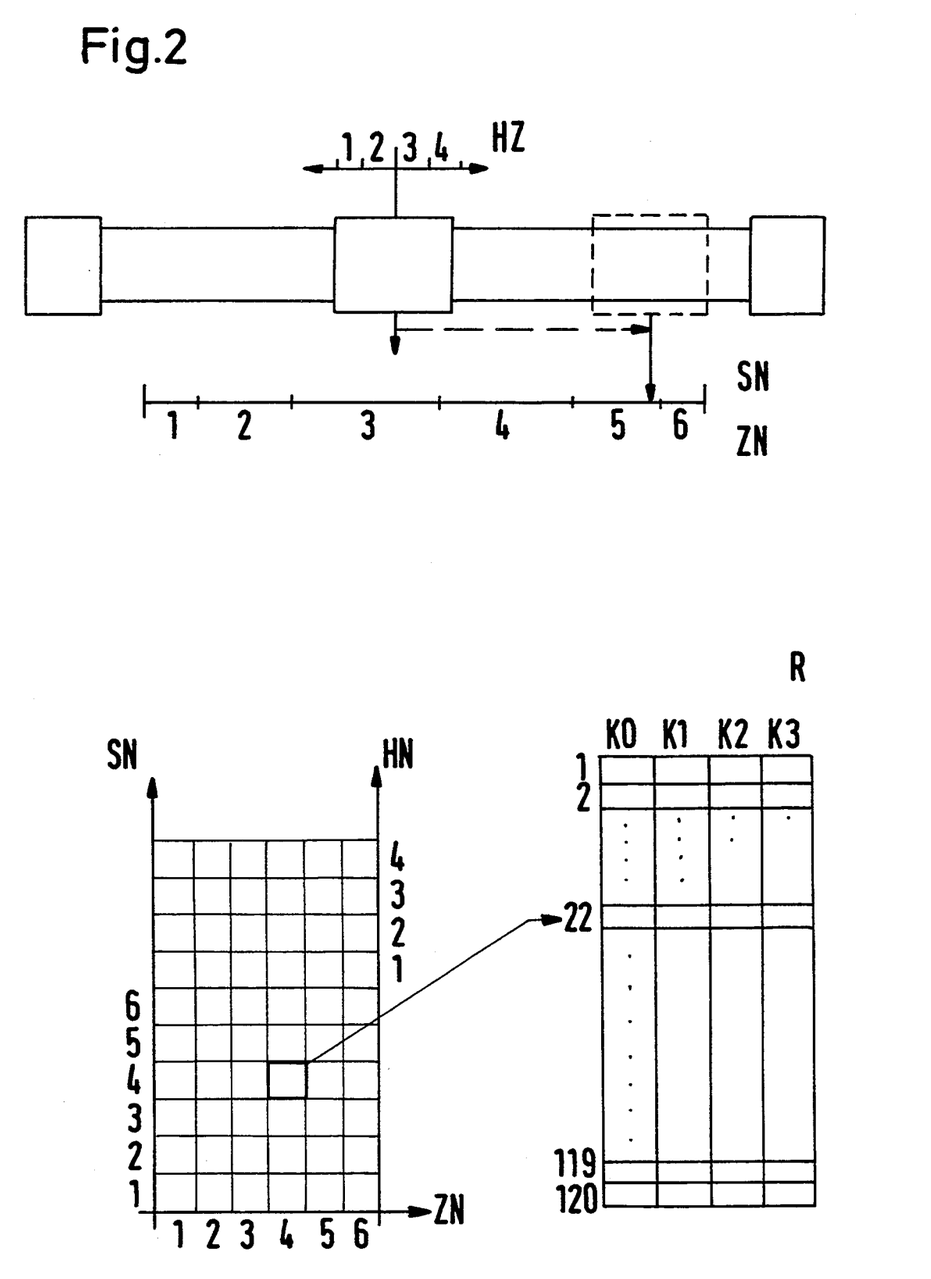
FIG. 2 is a schematic access view relating to the automatic control parameter field.

A schematic diagram is shown in FIG. 2, according to which, for example, start and target position as well as the stroke of the slider carriage form the corresponding zone systems. The zones are in this context determined such that in case of a test drive, initiated at the beginning of the course of operation, the decisive and determining drive path is driven between the stop points, the stop points are determined, stored, and the drive distance is subdivided into zones and is stored in a computer. Then, the example illustrated in FIG. 2 furnishes the subdivision into starting zone, target zone, and stroke zone. In this context, it is not so important that these zones are distributed equidistantly, rather the possibility is to be used to perform, for example, a logarithmic subdivision of the zones with the aid of a computer. This is in particular associated with an advantage in case the complete stroke length is very large and where the pressure volumes to be subjected to compressed air vary substantially in their sizes. This adaptation is in each case required one time after a performed installation, i.e., the adaptation of the drive to the work purpose.

In this context, the following values are defined:
NS: Number of the starting zones
SN: Index of the starting zone
NZ: Number of the target zones
ZN: Index of the target zone
NH: Number of the stroke zones
HN: Index of the stroke zone
NG: Number of the speed zones
GN: Index of the speed zones
NL: Number of the load zones
LN: Index of the load zone.
NP: Number of the parameter sets.

In this context, this value is calculated as follows:

$$NP = NZ \times (NS + NH) \times NL.$$

PN: Number of the desired parameter set.
This can be calculated for large strokes as follows:

$$PN = ZN + (SN-1) \times NZ + (LN-1) \times NZ \times NS$$

and for small strokes:

$$PN = ZN + (HN-1) \times NZ + (LN-1) \times NZ \times NH + NZ \times NS \times NL$$

For example, there results from NH=4, NZ=6, NS=6, NL=2, then the number of the parameter sets NP=120. Thus, 120 parameter sets have to be available in the automatic control parameter field R, where the parameters of the parameter sets are designated with the numerals K0, K1, K2, etc.

The advantages of such an automatic control parameter determination will become clear based on the following example. If the slider carriage is disposed in the region of one of the end positions of the linear drive, then the slider carriage requires, in order to move from this starting position by, for example, a distance of 30% of the maximum possible drive distance, a certain automatically time-controlled compressed air volume. For this purpose, a different parameter set is required than, for example, for moving the slider carriage from about the center of the linear drive by about the same drive distance of about 30% of the maximum possible drive path. This is based on the fact that in the first case the volume, to be subjected to compressed air for moving the slider carriage, is a different volume than in the second case, where the slider carriage is started approximately at the center of the linear drive. This holds also, even though the distance passed over in the final end, i.e., the stroke, is of an equal numerical value.

Figure 3:
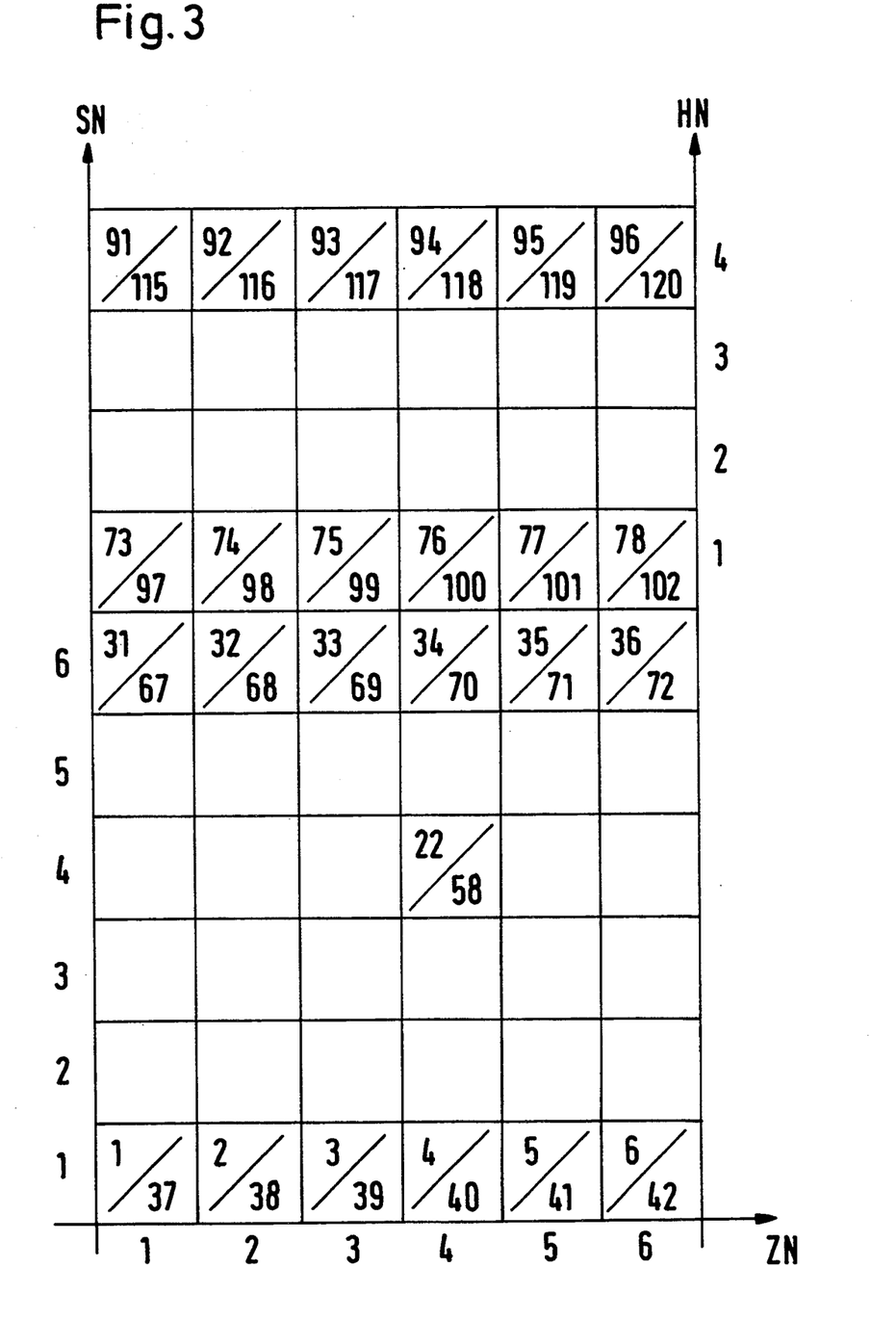
FIG. 3 is a detail view of the embodiments of FIG. 2.

The schematic diagram view of FIG. 2 is illustrated further in FIG. 3, where the data addresses are determined in detail. It is assumed for the present embodiment that NS=6, NZ=6, and NH=4, i.e., in other words, that in the present embodiment both the starting as well as the target positions are sub-divided in each case into six zones. The stroke positions or, respectively, the stroke lengths are subdivided into four zones. From this results the schematic diagram which, already illustrated in FIG. 2, is shown in detail in FIG. 3. In this case, each position, i.e., each square within the field, is covered with two numbers, which allow in combination to correlate the zone systems relative to each other. This sense of the two numbers per square becomes more clear based on an example. If the starting point is in the start zone 4 and the target point is in the target zone 4, then there results the square with the number combination 22/58 in the field. If there is now entered as additional information that a small load is to be moved, then the number 22 is decisive, and in the case of a large load, the number 58 is decisive. This means that, according to this example, the parameter set 22 is used for control purposes in connection with a small load and, in case of a large load, the parameter set 58 is used for calculating the control position. As previously detailed above, it is a matter of a total of 120 parameter sets in case of the given arrangement possibility. These parameter sets are those which result in the numbers of the combination comprising two numbers for each square in the field.

A so-called stroke-dependent automatic control represents a further example. If the desired target position is in the target zone 5 and if the stroke moves in the region of the stroke zone 1, there results the square in the zone field with the numerals 77/101, which are then determining in a corresponding way again the data address in the automatic control parameter field. In this case, automatic control parameter sets are hidden behind these illustrated numbers, where the automatic control parameter sets comprise the physical parameters or, respectively, values of the system, already described in detail.

It becomes clear from this example that, based on the zone subdivision of several values and thus the creation of several zones, where the data address for the automatic control parameter is then calculated from the indices of the zones, a much more useful and practical automatic control is provided which furnishes the recited advantages for the positioning drives.

It will be understood that each of the elements described above, or two or more together, may also find a useful application in other methods for a control of drives differing from the methods described above.

While the invention has been illustrated and described as embodied in the context of a method for adaptive control of position-adjustable drives, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for the adaptive automatic control of position-adjustable drives for determining parameters, optimized from the drive motion comprising the steps:
   evaluating a drive distance determining an operational course between its stops points; subdividing said drive distance into calculated, consecutively numbered evaluation zones; storing values of the evaluation zones in a data memory storage;
   determining the parameters describing the drive motion with the aid of the thus calculated evaluation zones; assigning the parameters describing the drive motion in each case into a consecutively numbered zone system;
   storing the parameters in the data memory storage;
   deriving and assigning a data address from the number of a zone of a first zone system and from the number of a zone of a second zone system;
   storing an automatic control parameter field for the drive motion in the memory storage;
   addressing the automatic control parameter field with the derived and assigned data address for obtaining control parameters;
   entering the control parameters into an automatic control circuit for determination of a set point.

2. The method for the adaptive automatic control of position-adjustable drives according to claim 1 further comprising
   correcting said parameters upon deviation based on parameters stored in the data memory storage.

3. The method for the adaptive automatic control of position-adjustable drives according to claim 1, wherein the evaluation zones are distance zones.

4. The method for the adaptive automatic control of position-adjustable drives according to claim 1, wherein the evaluation zones are angle zones.

5. The method for the adaptive automatic control of position-adjustable drives according to claim 1 further comprising
   employing possible start positions of the drive from a first zone system and possible target positions of the drive from a second zone system for calculating a data address in the automatic control parameter field.

6. The method for the adaptive automatic control of position-adjustable drives according to claim 1 further comprising
   using possible starting positions of the drive from a first zone system and the possible drive distances of the drive from a second zone system for calculating a data address of the automatic control parameter field.

7. The method for the adaptive automatic control of position-adjustable drives according to claim 1 further comprising
   using possible starting positions of the drive from a first zone system and possible drive angles of the drive from a second zone system for calculating a data address of the automatic control parameter field.

8. The method for the adaptive automatic control of position-adjustable drives according to claim 1 further comprising
   using possible target positions of the drive from a first zone system and the possible drive distances of the drive from a second zone system for calculating a data address of the automatic control parameter field.

9. The method for the adaptive automatic control of position-adjustable drives according to claim 1 further comprising
   using possible target positions of the drive from a first zone system and possible drive angles of the drive from a second zone system for calculating a data address of the automatic control parameter field.

10. The method for the adaptive automatic control of position-adjustable drives according to claim 1 further comprising
    forming a further zone system with the drive speeds required for the positioning tasks; using the numerical values of the further zone system additionally for a calculation of the data address in the automatic control parameter field.

11. The method for the adaptive automatic control of position-adjustable drives according to claim 1 further comprising
    taking the mass load into consideration in a further zone system, wherein the number of the corresponding mass load zones is determined from the start acceleration, and wherein the corresponding number of the zone is also used for the calculation of the data address of the automatic control parameter field.

12. A method for the adaptive automatic control of a position-adjustable drives, where parameters, optimized from the drive motion, are determined, comprising the following steps:
    correcting, upon deviation, said parameters based on parameters stored in a data memory, storing the corrected parameters in the data memory,
    evaluating a drive distance, determining an operational course, between its stop points,
    subdividing said drive distance into calculated, consecutively numbered evaluation zones,
    storing values of the evaluation zones in a data memory storage, wherein the parameters describing the drive motion are determined with the aid of the thus calculated evaluation zones, and in each case are subdivided into a consecutively numbered zone system and are stored in the data memory storage,
    calculating a data address from the number of a zone of a first zone system and from the number of zone of at least a second zone system, and storing an automatic control parameter field for the drive motion in a memory storage
    controlling the automatic control parameter field with the calculated data address, and entering the control parameters for the adjustment value determination for the determination of a setpoint into the automatic control.

13. The method for the adaptive automatic control of position-adjustable drives according to claim 12, wherein the evaluation zones are distance zones.

14. The method for the adaptive automatic control of position-adjustable drives according to claim 12, wherein the evaluation zones are angle zones.

15. The method for the adaptive automatic control of position-adjustable drives according to claim 12, wherein the possible start positions of the drive from a first zone system and the possible target positions of the drive from a second zone system are employed for calculating the data address in the automatic control parameter field.

16. The method for the adaptive automatic control of position-adjustable drives according to claim 12, wherein the possible starting positions or target positions of the drive from a first zone system and the possible drive distances or the drive angles of the drive from a second zone system are used for calculating the data address of the automatic control parameter field.

17. The method for the adaptive automatic control of position-adjustable drives according to claim 16, wherein the drive speeds required for the positioning tasks form a further zone system, where the numerical values of the further zone system are also used for the calculation of the data address in the automatic control parameter field.

18. The method for the adaptive automatic control of position-adjustable drives according to claim 17, wherein the mass load is taken into consideration in a further zone system, wherein the number of the corresponding mass load zones is determined from the start acceleration, and wherein the corresponding number of the zone is also used for the calculation of the data address of the automatic control parameter field.

* * * * *